US012770528B2

(12) United States Patent
Maris et al.

(10) Patent No.: US 12,770,528 B2
(45) Date of Patent: Oct. 20, 2026

(54) METHOD AND SYSTEM FOR MULTI-STAGE TESTING (MST) CALIBRATION

(71) Applicant: Tata Consultancy Services Limited, Mumbai (IN)

(72) Inventors: Gunter Maris, Brussels (BE); Timo Bechger, Amsterdam (NL); Gaurav Tandon, Lucknow (IN); Viral Prakash Shah, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/966,228

(22) Filed: Dec. 3, 2024

(65) Prior Publication Data

US 2025/0201140 A1 Jun. 19, 2025

(30) Foreign Application Priority Data

Dec. 15, 2023 (IN) ............................ 202321085799

(51) Int. Cl.
*G09B 7/00* (2006.01)
*G09B 7/077* (2006.01)
*G09B 7/08* (2006.01)

(52) U.S. Cl.
CPC ..................................... *G09B 7/00* (2013.01)

(58) Field of Classification Search
CPC ............ G09B 7/00; G09B 7/08; G09B 7/077
See application file for complete search history.

(56) References Cited

U.S. PATENT DOCUMENTS

2014/0278686 A1* 9/2014 Mullings ............ G06Q 10/1097 705/7.21
2016/0217701 A1* 7/2016 Brown ..................... G09B 7/00
2016/0379510 A1* 12/2016 Rainey ..................... G09B 7/06 434/362

OTHER PUBLICATIONS

Zheng et al., Multistage Adaptive Testing for a Large-Scale Classification Test, 2012, ACT Inc. (Year: 2012).*

(Continued)

*Primary Examiner* — Eddy Saint-Vil
(74) *Attorney, Agent, or Firm* — Finnegan, Henderson, Farabow, Garrett & Dunner, LLP

(57) ABSTRACT

MST calibration is required to ensure that all examinees are assessed on a common scale. State of the art approaches have the disadvantages that they become computationally unstable and demanding or may have standard errors of estimated item parameters. Method and system in the embodiments disclosed herein provide a module-wise calibration approach in which a shift parameter value is estimated as difference in the average difficulty level between each two modules from among the plurality of modules. Further, based on the estimated value of the shift parameter, the estimated average difficulty level of each of the plurality of modules is aligned to a common scale. By aligning each of the plurality of modules to the common scale users who took different combinations of the plurality of modules are assessed on the common scale.

6 Claims, 2 Drawing Sheets

(56) References Cited

OTHER PUBLICATIONS

Helbling et al., "Flexibility at the Price of Volatility: Concurrent Calibration in Multistage Tests in Practice Using a 2PL Model," Front. Educ. 6:679864 (2021).
Kubinger et al., "Biased (conditional) parameter estimation of a Rasch model calibrated item pool administered according to a branched testing design," Psychological Test and Assessment Modeling, 54(4): 450-460 (2012).
Wang et al., "Item Calibration Methods with Multiple Sub-scale Multistage Testing," Journal of Educational Measurement (2019).

* cited by examiner

METHOD AND SYSTEM FOR MULTI-STAGE TESTING (MST) CALIBRATION

PRIORITY CLAIM

This U.S. patent application claims priority under 35 U.S.C. § 119 to: Indian Patent Application number 202321085799, filed on Dec. 15, 2023. The entire contents of the aforementioned application are incorporated herein by reference.

TECHNICAL FIELD

The disclosure herein generally relates to multistage testing, and, more particularly, to method and system for multi-stage testing (MST) calibration.

BACKGROUND

Multi-Stage Testing (MST) is an adaptive testing approach used for assessment of examinees. MST uses items selected in pre-assembled bunches, or modules, of varying difficulty. However, MST has certain challenges/dis-advantages such as but not limited to it is necessary to know the difficulty of each item before testing, i.e., to have a calibrated item bank. This requires large-scale pre-testing under authentic testing conditions. From the different bunches or blocks of questions of varying difficulty levels, different blocks are picked and used to assess different candidates, wherein all users are given a common first block, and then based on accuracy of response of each user to the first block, subsequent blocks are selected and given to respective users. This means that the users who answered comparatively better to the first block of questions get comparatively more difficult set of questions in subsequent blocks. This approach poses the challenge that different users/candidates end up getting assessed at different scales.

In order to address this challenge, calibration is done during which different properties of the various questions given to the examinees are estimated, which in turn maybe considered while assessing performance of the examinees. An existing calibration approach is concurrent calibration, in which all the item parameters are estimated in one go. Difficulty of different blocks $\delta_A$, $\delta_B$ and $\delta_C$ are estimated subject to the constraint that their sum equals zero, aligning all item parameters are to a same scale and then the estimated ability parameters are compared across test forms. Disadvantage of this approach is that it becomes computationally unstable and demanding for large assessments. Alternative approaches in the literature, mean-mean linking and fixing item parameters, overcome these, but at the cost of significantly increasing the standard errors of estimated item parameters.

SUMMARY

Embodiments of the present disclosure present technological improvements as solutions to one or more of the above-mentioned technical problems recognized by the inventors in conventional systems. For example, in one embodiment, a processor implemented method is provided. The method includes obtaining a Multi-Stage Testing (MST) block as input, wherein the MST block comprises of a plurality of questions distributed across a plurality of modules. Further, the MST block is calibrated, wherein calibrating the MST block includes the following steps. Initially, an average difficulty level of each of the plurality of modules is estimating. Further, difference in the average difficulty level between each two modules from among the plurality of modules is estimated, wherein the estimated difference in the average difficulty level is identified as a shift factor. Further, the estimated average difficulty level of each of the plurality of modules is aligned to a common scale based on the shift factor.

In an embodiment of the method, by aligning the estimated average difficulty level of each of the plurality of modules to the common scale, a plurality of users who took different combinations of the plurality of modules are assessed on the common scale.

In another embodiment of the method, an extended Rasch model is used to estimate the average difficulty level of each of the plurality of modules and the difference in the average difficulty level between each two modules from among the plurality of modules.

In another embodiment of the method, the average difficulty level of each of the plurality of modules indicates a relative difficulty of a plurality of questions across the plurality of modules.

In yet another embodiment, a system is provided. The system includes one or more hardware processors, a communication interface, and a memory storing a plurality of instructions. The plurality of instructions cause the one or more hardware processors to obtain a Multi-Stage Testing (MST) block as input, wherein the MST block comprises of a plurality of questions distributed across a plurality of modules. Further, the MST block is calibrated, wherein calibrating the MST block includes the following steps. Initially, an average difficulty level of each of the plurality of modules is estimating. Further, difference in the average difficulty level between each two modules from among the plurality of modules is estimated, wherein the estimated difference in the average difficulty level is identified as a shift factor. Further, the estimated average difficulty level of each of the plurality of modules is aligned to a common scale based on the shift factor.

In yet an embodiment of the system, by aligning the estimated average difficulty level of each of the plurality of modules to the common scale, a plurality of users who took different combinations of the plurality of modules are assessed on the common scale.

In yet another embodiment of the system, an extended Rasch model is used to estimate the average difficulty level of each of the plurality of modules and the difference in the average difficulty level between each two modules from among the plurality of modules.

In yet another embodiment of the system, the average difficulty level of each of the plurality of modules indicates a relative difficulty of a plurality of questions across the plurality of modules.

In yet another aspect, a non-transitory computer readable medium is provided. The non-transitory computer readable medium includes a plurality of instructions, which when executed, cause one or more hardware processors to obtain a Multi-Stage Testing (MST) block as input, wherein the MST block comprises of a plurality of questions distributed across a plurality of modules. Further, the MST block is calibrated, wherein calibrating the MST block includes the following steps. Initially, an average difficulty level of each of the plurality of modules is estimating. Further, difference in the average difficulty level between each two modules from among the plurality of modules is estimated, wherein the estimated difference in the average difficulty level is identified as a shift factor. Further, the estimated average difficulty level of each of the plurality of modules is aligned to a common scale based on the shift factor.

In an embodiment of the non-transitory computer readable medium, by aligning the estimated average difficulty level of each of the plurality of modules to the common scale, a plurality of users who took different combinations of the plurality of modules are assessed on the common scale.

In another embodiment of the non-transitory computer readable medium, an extended Rasch model is used to estimate the average difficulty level of each of the plurality of modules and the difference in the average difficulty level between each two modules from among the plurality of modules.

In another embodiment of the non-transitory computer readable medium, the average difficulty level of each of the plurality of modules indicates a relative difficulty of a plurality of questions across the plurality of modules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In order to address the problem of different examinees getting assessed based on answers given to different set of questions in MST, calibration is done during which different properties of the various questions given to the examinees are estimated, which in turn maybe considered while assessing performance of the examinees. An existing calibration approach is concurrent calibration, in which all the item parameters are estimated in one go. Difficulty of different blocks $\delta_A$, $\delta_B$ and $\delta_C$ are estimated subject to the constraint that their sum equals zero, aligning all item parameters are to a same scale and then the estimated ability parameters are compared across test forms. Disadvantage of this approach is that it becomes computationally unstable and demanding for large assessments. Alternative approaches in the literature, mean-mean linking and fixing item parameters, overcome these, but at the cost of significantly increasing the standard errors of estimated item parameters.

In order to address these challenges, method and system disclosed herein use a calibration approach in which initially a Multi-Stage Testing (MST) block is obtained as input, wherein the MST block comprises of a plurality of questions distributed across a plurality of modules. Further, the MST block is calibrated, wherein calibrating the MST block includes the following steps. Initially, an average difficulty level of each of the plurality of modules is estimating. Further, difference in the average difficulty level between each two modules from among the plurality of modules is estimated, wherein the estimated difference in the average difficulty level is identified as a shift factor. Further, the estimated average difficulty level of each of the plurality of modules is aligned to a common scale based on the shift factor. By aligning each of the plurality of modules to the common scale, a plurality of users who took different combinations of the plurality of modules are assessed on the common scale. This approach of splitting the calibration in two stages has been found to be striking a balance between scalability and precision.

Figure 1:
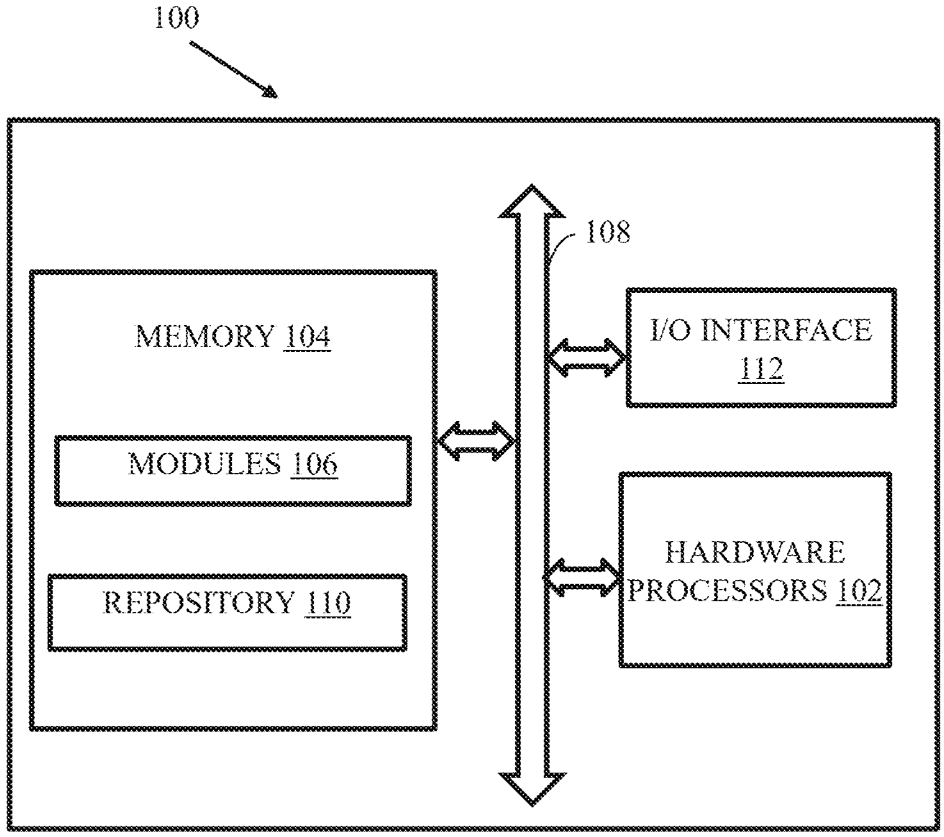
FIG. 1 illustrates an exemplary system for MST calibration, according to some embodiments of the present disclosure.
Figure 2:
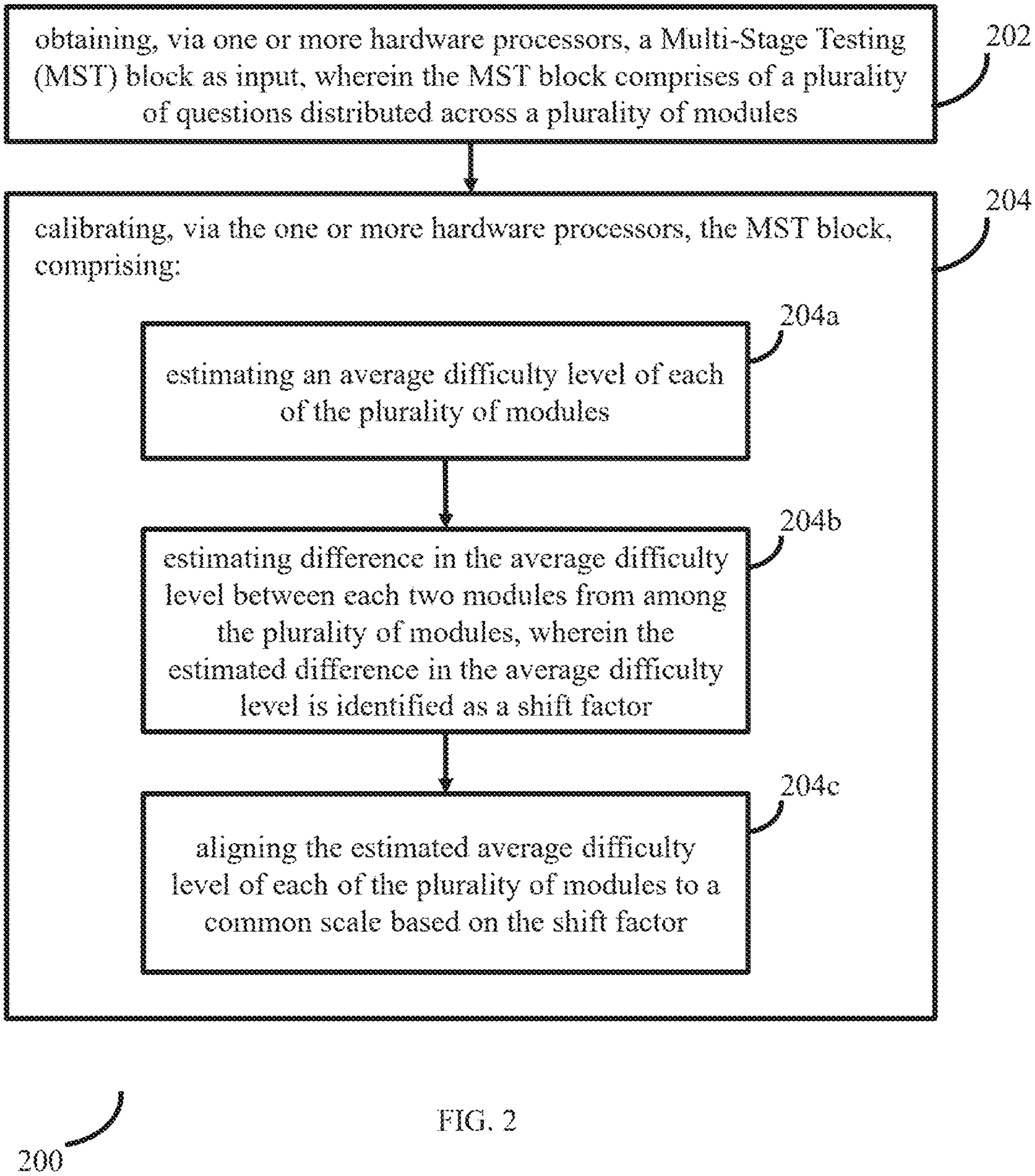
FIG. 2 is a flow diagram depicting steps involved in the process of MST calibration being performed by the system of FIG. 1, according to some embodiments of the present disclosure.

Referring now to the drawings, and more particularly to FIG. 1 through FIG. 2, where similar reference characters denote corresponding features consistently throughout the figures, there are shown preferred embodiments and these embodiments are described in the context of the following exemplary system and/or method.

FIG. 1 illustrates an exemplary system for MST calibration, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of the MST calibration, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the MST calibration.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagram in FIG. 2.

FIG. 2 is a flow diagram depicting steps involved in the process of MST calibration being performed by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of method 200 in FIG. 2, the system 100 obtains a Multi-Stage Testing (MST) block as input, wherein the MST block comprises of a plurality of questions distributed across a plurality of modules. Each of the plurality of modules may have a unique set of questions, and hence difficulty level of the modules vary.

Further, at step 204 of the method 200, the system 100 calibrates the MST block. The calibration of the MST block includes steps 204*a* through 204*c*. At step 204*a* of the method 200, the system 100 estimates an average difficulty level of each of the plurality of modules. The average difficulty level of each of the plurality of modules indicates a relative difficulty of a plurality of questions across the plurality of modules.

Further, at step 206 of the method 200, the system 100 estimates difference in the average difficulty level between each two modules from among the plurality of modules. The estimated difference in the average difficulty level is identified as a shift factor.

In another embodiment of the method, an extended Rasch model is used to estimate the average difficulty level of each of the plurality of modules and the difference in the average difficulty level between each two modules from among the plurality of modules.

The extended Rasch model based estimation of average difficulty level between each two modules and for each of the plurality modules are described below:

a. Notations Used

Let any response to item i (i.e., question) be scored into one of $m_i \geq 1$ categories indexed $j=0, \ldots, m_i$. Note that index i is consistently used to refer to items and j to refer to categories. A response in category j earns a respondent $a_{ij}$ points and the test score is the sum of the points earned on each of the items in the test.

Each item response is associated with a discrete random variable, $X_i$ where $X_i=j$ denotes the event that a person's response was in category j. Upper-case letters are used for random variables and lower-case letters are used for their realization. When there is no risk of confusion, lower case letters are used for both representations.

$y_{ij}$ is defined as a dummy-coded response to item i; that is, $y_{ij}=1$ if a response in category $j \in \{0, \ldots, m_i\}$ is given to item i, and zero otherwise. Using the dummy-coded responses, the test score can then be written as:

$$y_{++} = \sum_i \sum_j y_{ij} a_{ij}.$$

Note that the second sum runs over all categories of item i.

b. Test Design

An examinee assessment project may include both linear and multi-stage tests. The items are divided over the modules, which are mutually exclusive sets. The modules are items that are always administered together. A booklet is an ordered sequence of one or more modules where each module comes with a range of possible scores on this and previous modules.

Some notation is needed around the design of the test. We let $\mathcal{B}_k$ refer to the k-th booklet, and $\mathcal{M}_h$ to the h-th module. To avoid excessive notation, these symbols are used in different ways.

$h \in \mathcal{B}_k$ is written when module h is in booklet k.

$p \in \mathcal{M}_h$ is written for persons p that have answered to the items in module h.

c. Measurement Model

A Nominal Response Model (NRM, Bock, 1972) was considered by the system 100 where the scoring parameters of the response categories are known integers. The model is an extension of a one-parameter logistic model and encompasses the Rasch model and a partial credit model. It shares with these models that the test score is a sufficient statistic for student ability. Suppressing a person index, the manifest probabilities for a marginal NRM are:

$$p(y \mid b, a) = \int_0^\infty \prod_i \frac{\prod_j (b_{ij} t^{a_{ij}})^{y_{ij}}}{1 + \sum_j b_{ij} t^{a_{ij}}} f(t) dt, \quad (1)$$

where t>0 denotes student ability with density f, $$f,\ b_{ij} = \exp(-\delta_{ij}) \text{ with } \delta_{ij}$$

the parameter of category j of item i, and $a_{ij}$ the corresponding score.

Following the derivation of the extended Rasch model in Maris, Bechger and San-Martin (2015), the manifest probabilities are rewritten as:

$$p(y \mid b, \lambda, a) = \frac{\prod_i \prod_j b_{ij}^{y_{ij}}}{\gamma_{y++}(b)} \frac{\gamma_{y++}(b) \lambda_{y++}}{\sum_s \gamma_s(b) \lambda_s} \quad (2)$$

These correspond to a marginal NRM if, and only if, the $\gamma_s$ are moments of the ability distribution for a score of zero on all items. This is not required, and instead, an extended NRM is considered because no assumptions on the ability distribution are implied. First term in (2) is the conditional likelihood, $$p(y \mid y_{++}, b, a),$$

and CML estimates of the item-category parameters are equivalent to their maximum likelihood estimates under the extended model.

Elementary symmetric functions $\gamma_s$ play an important role in subsequent steps, and are represented as:

$$\gamma_s(b) = \sum_{y: y_{++} = s} \prod_i \prod_j b_{ij}^{y_{ij}} \quad (3)$$

where the sum is overall response patterns leading to a test score s. $\gamma_s(b)$ is defined to be zero for test scores that cannot occur, i.e., $$s < 0 \text{ or } s > M - \sum_i a_{im_i}.$$

d. Properties of Elementary Symmetric Functions

The calibration approach used by the system 100, termed as Module-wise calibration, uses three properties of elementary symmetric functions.

Change-of-origin property. Let c denote a positive real constant. Suppose each entry $b_{ij}$ of b is multiplied by $$c^{a_{ij}} -$$

This is written as cab.

$$\text{Then, } \gamma_s(c^a b) = c^s \gamma_s(b).$$

Recurrence relation. Let $$\gamma_s^{[k]}(b)$$

denotes the ESF with the parameters of the first k items—with the order of the items arbitrary. The elementary symmetric functions with k and k−1 items, k=2, . . . , m, satisfy the following relation:

$$\gamma_s^{[k]}(b) = \gamma_s^{[k-1]}(b) + \sum_{j=1}^{m_i} \gamma_{s-a_{kj}}^{[k-1]}(b) b_{kj}, \quad (4),$$

$$\text{where } \gamma_0^{[1]}(b) = 1 \text{ and } \gamma_{a_{1j}}^{[1]}(b) = b_{ij},\ j = 0, \ldots, m_i.$$

Grouping Property. The elementary symmetric function of a booklet are obtained from those calculated on each of the modules as:

$$\gamma_s(b) = \sum_{\sum_{h \in \mathcal{B}} s_h = s} \prod_{h \in \mathcal{B}} \gamma_{s_h}(b^{[\mathcal{M}_h]}), \quad (5)$$

where the sum is over all combinations of the module scores leading to a booklet score s.

The change-of-origin property describes the effect of a change in the origin of the item-category parameters. That is, if, for all i and j, $$\delta_{ij} \to \delta_{ij} - \eta a_{ij} \Rightarrow b_{ij} \to \exp(\eta)^{a_{ij}} b_{ij} \Rightarrow \gamma_s(b) \to \exp(s\eta) \gamma_s(b).$$

In the module-wise calibration, the values η needed to "shift" the parameters of each module onto a common scale is estimated.

A recurrence relation used in this approach provides a method to calculate the elementary symmetric functions of the modules, using a sum-algorithm by Andersen (1972) which was shown to be numerically stable by Verhelst, Glas, and van der Sluijs (1984).

The grouping property shows how the elementary symmetric functions of a booklet can be obtained from those of its modules. This proved to be essential in MST as it provides a way to calculate the elementary symmetric functions of a booklet while accounting for various routing rules, by respecting restrictions on the range of the module scores.

Then the module-wise calibration is performed as below: Conditional likelihood of a person taking a booklet $\mathcal{B}$ is written as:

$$p(x \mid x_+^{[\mathcal{B}]}) = \left(\prod_{j \in \mathcal{B}} p(x^{[\mathcal{M}_j]} \mid x_+^{[\mathcal{M}_j]})\right) p(x_+^{[\mathcal{B}]} \mid x_+^{[\mathcal{B}]}) \quad (6)$$

where $$x_+^{[\mathcal{B}]} = \sum_{j \in \mathcal{B}} x_+^{[j]},$$

the sum of the module scores, and $$x_+^{[\mathcal{B}]} = \left(x_+^{[j]}\right),\ j \in \mathcal{B}$$

is the vector of scores on each of the modules in booklet $\mathcal{B}$.

First factor in (6) is product of the conditional likelihoods of each of the modules and contains all information on the within-module relative difficulties of the items. Second factor in (6) is the conditional distribution of the module scores and contains all information regarding the between-module difficulties.

Module-wise calibration entails maximization of each factor separately.

1. Regular Conditional Maximum Likelihood (CML) is used to estimate the item parameters, $b^{[j]}$, of each module in separate calibrations.
2. CML estimates of the shift parameters, $\eta_j$, that bring the module parameters on a common scale, are determined keeping the relative within module difficulties at their estimated values.

The likelihood of the shift parameters is the distribution of module scores conditional on the total test scores. For an examinee making booklet $\boldsymbol{\mathcal{B}}$ this is:

$$p(x_+^{|\mathcal{B}|} \mid x_+^{|\mathcal{B}|}) = \frac{\prod_{j \in \mathcal{B}} \gamma_{x_+^{[j]}}\left(b^{[j]}\right)\exp\left(x_+^{[j]}\eta_j\right)}{\sum_{s:\sum_{h \in \mathcal{B}} s_h = x_+} \prod_{j \in \mathcal{B}} \gamma_{s_j}\left(b^{[j]}\right)\exp\left(x_+^{[j]}\eta_j\right)} \tag{7}$$

(7) is a member of the exponential family of distributions, and follows that ML estimation entails finding the value of $\eta_j$ such that its sufficient statistics $S_j$ equals the conditional expectation under the model. That is, the estimation equations take the form:

$$\text{Find } \eta_j \text{ such that } S_j = E[S_j \mid x_+] \tag{8}$$

From the CML:

$$S_j = \sum_{v \in \mathcal{M}_j} x_{v+}^{[\mathcal{M}_j]}$$

Which is the sum of module scores over all persons taking the module. This is re-written as a sum across booklets, then any booklet that contains module j contributes:

$$\sum_k n_k \sum_{s:\ \sum_{h \in \mathcal{B}} s_h = k} s_j \frac{n_s}{n_k} \tag{9}$$

where $n_k$ is the number of examinees with booklet score k, and $n_s$ the number of people with a combination of module scores s.

The estimation equations are then solved numerically. To this effect, first and second-order derivatives of the conditional log-likelihood are used.

The first-order derivatives are the conditional expectations of the sufficient statistics. The conditional expectations replacing the observed proportions $n_s/n_k$ are found by the corresponding conditional probabilities under the model. Thus, it follows that any booklet that contains module j contributes a factor, $$\sum_k n_k \sum_{s:\sum_{h \in \mathcal{B}} s_h = k} s_j p(x_+^{[\mathcal{B}]} = s \mid x_+^{[\mathcal{B}]} = k) \tag{10}$$

to the first-order derivative with respect to $\eta_j$.

The second-order derivatives are the conditional covariances of the sufficient statistics. Any booklet that contains modules j and i contributes:

$$\sum_k n_k \sum_{s:\sum_{h \in \mathcal{B}} s_h = k} s_j s_i p(x_+^{[\mathcal{B}]} = s \mid x_+^{[\mathcal{B}]} = k) \tag{11}$$

to the second-order derivatives with respect to $\eta_j$ and $\eta_i$.

The second-order derivatives, evaluated at the final estimates, allow to obtain the standard errors of the estimates, through a standard statistical argument. Specifically, the standard error of a shift parameter is 1 over the square root of the second-order derivative.

Further, at step 208 of the method 200, the system 100 aligns the estimated average difficulty level of each of the plurality of modules to a common scale based on the shift factor. By aligning each of the plurality of modules to the common scale, a plurality of users who took different combinations of the plurality of modules are assessed on the common scale. Using a change-of-origin property, the system 100 obtains the item parameters across all modules on a common scale: for all items in module k the transformation $\delta_{ij} \rightarrow \delta_{ij} - \eta_k a_{ij}$ is used.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of MST calibration. The embodiment, thus provides a module-wise calibration approach for the MST calibration, in which value of a shift parameter is calculated. Moreover, the embodiments herein further provide a mechanism for aligning modules to a common scale, based on the estimated shift parameter.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

obtaining, via one or more hardware processors, a Multi-Stage Testing (MST) block as input, wherein the MST block comprises of a plurality of questions or items distributed across a plurality of modules, wherein the modules are mutually exclusive sets of items that are administered together and wherein an ordered sequence of modules where each module has a range of scores is called a booklet; and calibrating, via the one or more hardware processors, the MST block, wherein calibrating the MST block uses module-wise calibration comprising a plurality of properties of elementary symmetric functions of change-of-origin property, recurrence relation and grouping property, wherein the change-of-origin property describes effect of a change in origin of item category parameters, wherein for all i and j:

$$\delta_{ij} \rightarrow \delta_{ij} - \eta a_{ij} \Rightarrow b_{ij} \rightarrow \exp(\eta)^{a_{ij}} b_{ij} \Rightarrow \gamma_s^{(b)} \rightarrow \exp(s\eta)\, \gamma_s(b),$$

where i refers to items and j refers to categories, wherein values η needed to shift the item category parameters of each module onto the common scale is estimated using the module-wise calibration and wherein calibrating the MST block is performed in two stages for striking a balance between scalability and precision, the two stages of calibration comprises:

estimating an average difficulty level of each of the plurality of modules, estimating difference in the average difficulty level between each two modules from among the plurality of modules, wherein the estimated difference in the average difficulty level is identified as a shift factor, wherein Conditional Maximum Likelihood (CML) estimates of the shift factor, η, brings module parameters on a common scale, wherein an extended Rasch model is used to i) estimate the average difficulty level of each of the plurality of modules and ii) estimate the difference in the average difficulty level between each two modules from among the plurality of modules, and wherein a test score is computed using the extended Rasch model and is given by $$\gamma_{++} = \sum_i \sum_j \gamma_{ij}\, a_{ij},$$

wherein $y_{ij}$ is defined as a dummy-coded response to item i, and $y_{ij}=1$ if a response in category $$j \in \left\{\prod, \ldots, m_i\right\}$$

is given to item i, and zero otherwise and wherein elementary symmetric functions $\gamma_s$ is represented as:

$$\gamma_s(b) = \sum_{\gamma:\gamma_{++}=s} \prod_i \prod_j b_{ij}^{y_{ij}}$$

where the sum is overall response patterns leading to a test score and $\gamma_s(b)$ is defined to be zero for test scores that cannot occur;

determining, via the one or more hardware processors, a Conditional likelihood of an user taking a booklet $\underline{\mathcal{B}}$ which is given by:

$$p\left(x|x_+^{[\mathcal{B}]}\right) = \left(\prod_{j\in\mathcal{B}} p\left(x^{[\mathcal{M}_j]}|x_+^{[\mathcal{M}_j]}\right)\right) p\left(x_+^{[\mathcal{B}]}|x_+^{[\mathcal{B}]}\right) \text{ where } x_+^{[\mathcal{B}]} = \sum_{j\in\mathcal{B}} x_+^{[j]},$$

the sum of the module scores, and $$x_{+}^{[\mathcal{B}]} = \left(x_{+}^{[j]}\right),\ j \in \mathcal{B}$$

is the vector of scores on each of the modules in booklet $\mathcal{B}$, wherein calibration is performed by maximizing each factor of Conditional likelihood separately, wherein Regular Conditional Maximum Likelihood (CML) is used to estimate the item parameters, $b^{[j]}$, of each module in separate calibrations and CML estimates of the shift parameters, $\eta_j$, that bring the module parameters on a common scale, are determined by keeping within-module relative difficulties of the items at estimated values; and aligning the estimated average difficulty level of each of the plurality of modules to a common scale based on the shift factor and comparing the estimated values across test forms, wherein the item category parameters across modules are aligned on a common scale using the change-of-origin property, wherein for items in module k, a transformation $$\delta_{ij} \to \delta_{ij} - \eta_k a_{ij}$$

is used, wherein by aligning the estimated average difficulty level of each of the plurality of modules to the common scale, a plurality of users who took different combinations of the plurality of modules are assessed on the common scale.

2. The processor implemented method of claim 1, wherein the average difficulty level of each of the plurality of modules indicates a relative difficulty of a plurality of questions across the plurality of modules.

3. A system, comprising:

one or more hardware processors;

a communication interface; and a memory storing a plurality of instructions, wherein the plurality of instructions cause the one or more hardware processors to:

obtain a Multi-Stage Testing (MST) block as input, wherein the MST block comprises of a plurality of questions or items distributed across a plurality of modules, wherein the modules are mutually exclusive sets of items that are administered together and wherein an ordered sequence of modules where each module has a range of scores is called a booklet; and calibrate the MST block, wherein calibrating the MST block uses module-wise calibration comprising a plurality of properties of elementary symmetric functions of change-of-origin property, recurrence relation and grouping property, wherein the change-of-origin property describes effect of a change in origin of item category parameters, wherein for all i anu j:

$$\delta_{ij} \to \delta_{ij} - \eta a_{ij} \Rightarrow b_{ij} \to \exp(\eta)^{a_{ij}} b_{ij} \Rightarrow \gamma_s(b) \to \exp(s\eta)\,\gamma_s(b),$$

where i refers to items and j refers to categories, wherein values $\eta$ needed to shift the item category parameters of each module onto the common scale is estimated using the module-wise calibration and wherein calibrating the MST block comprising is performed in two stages for striking a balance between scalability and precision by:

estimating an average difficulty level of each of the plurality of modules;

estimating difference in the average difficulty level between each two modules from among the plurality of modules, wherein the estimated difference in the average difficulty level is identified as a shift factor, wherein Conditional Maximum Likelihood (CML) estimates of the shift factor, $\eta$, brings module parameters on a common scale, wherein an extended Rasch model is used to estimate the average difficulty level of each of the plurality of modules and the difference in the average difficulty level between each two modules from among the plurality of modules and wherein a test score is computed using the extended Rasch model and is given by $$\gamma_{++} = \sum_i \sum_j y_{ij}\, a_{ij},$$

wherein $y_{ij}$ is defined as a dummy-coded response to item i, and $y_{ij}$=1 if a response in category $$j \in \{0, \ldots, m_i\}$$

is given to item i, and zero otherwise and wherein elementary symmetric functions $\gamma_s$ is represented as:

$$\gamma_s(b) = \sum_{y:y_{++}=s} \prod_i \prod_j b_{ij}^{y_{ij}}$$

where the sum is overall response patterns leading to a test score and $\gamma_s$(b) is defined to be zero for test scores that cannot occur;

determining, via the one or more hardware processors, a Conditional likelihood of an user taking a booklet $\mathcal{B}$ which is given by:

$$p\left(x|x_{+}^{[\mathcal{B}]}\right) = \left(\prod_{j\in\mathcal{B}} p\left(x^{[M_j]}|x_{+}^{[M_j]}\right)\right) p\left(x_{+}^{[\mathcal{B}]}|x_{+}^{[\mathcal{B}]}\right) \text{ where } x_{+}^{[\mathcal{B}]} = \sum_{j\in\mathcal{B}} x_{+}^{[j]},$$

the sum of the module scores, and $$x_{+}^{[\mathcal{B}]} = \left(x_{+}^{[j]}\right),\ j \in \mathcal{B}$$

is the vector of scores on each of the modules in booklet $\mathcal{B}$, wherein calibration is performed by maximizing each factor of Conditional likelihood separately, wherein Regular Conditional Maximum Likelihood (CML) is used to estimate the item parameters, $b^{[j]}$, of each module in separate calibrations and CML estimates of the shift parameters, $\eta_j$, that bring the module parameters on a common scale, are determined by keeping within-module relative difficulties of the items at estimated values; and aligning the estimated average difficulty level of each of the plurality of modules to a common scale based on the shift factor and comparing the estimated values across test forms, wherein the item category parameters across modules are aligned on a common scale using the change-of-origin property, wherein for all items in module k, a transformation $$\delta_{ij} \to \delta_{ij} - \eta_k a_{ij}$$

is used, wherein by aligning the estimated average difficulty level of each of the plurality of modules to the common scale, a plurality of users who took different combinations of the plurality of modules are assessed on the common scale.

4. The system of claim 3, wherein the average difficulty level of each of the plurality of modules indicates a relative difficulty of a plurality of questions across the plurality of modules.

5. One or more non-transitory machine-readable information storage mediums comprising one or more instructions which when executed by one or more hardware processors cause:

obtaining a Multi-Stage Testing (MST) block as input, wherein the MST block comprises of a plurality of questions distributed across a plurality of modules, wherein the modules are mutually exclusive sets of items that are administered together and wherein an ordered sequence of modules where each module has a range of scores is called a booklet; and calibrating the MST block, wherein calibrating the MST block uses module-wise calibration comprising a plurality of properties of elementary symmetric functions of change-of-origin property, recurrence relation and grouping property, wherein the change-of-origin property describes effect of a change in origin of item category parameters, wherein for all i and j:

$$\delta_{ij} \to \delta_{ij} - \eta a_{ij} \Rightarrow b_{ij} \to \exp(\eta)^{a_{ij}} b_{ij} \Rightarrow \gamma_s(b) \to \exp(s\eta)\,\gamma_s(b),$$

where i refers to items and j refers to categories, wherein values $\eta$ needed to shift the item category parameters of each module onto the common scale is estimated using the module-wise calibration and wherein calibrating the MST block comprising is performed in two stages for striking a balance between scalability and precision, the two stages of calibration comprises:

estimating an average difficulty level of each of the plurality of modules;

estimating difference in the average difficulty level between each two modules from among the plurality of modules, wherein the estimated difference in the average difficulty level is identified as a shift factor, wherein Conditional Maximum Likelihood (CML) estimates of the shift factor, $\eta$, brings module parameters on a common scale, wherein an extended Rasch model is used to estimate the average difficulty level of each of the plurality of modules and the difference in the average difficulty level between each two modules from among the plurality of modules and wherein a test score is computed using the extended Rasch model and is given by $$\gamma_{++} = \sum_i \sum_j y_{ij}\, a_{ij},$$

wherein $y_{ij}$ is defined as a dummy-coded response to item i, and $y_{ij}=1$ if a response in category $$j \in \{0, \ldots, m_i\}$$

is given to item i, and zero otherwise and wherein elementary symmetric functions $\gamma_s$ is represented as:

$$\gamma_s(b) = \sum_{y:y_{++}=s} \prod_i \prod_j b_{ij}^{y_{ij}}$$

where the sum is overall response patterns leading to a test score and $\gamma_s$(b) is defined to be zero for test scores that cannot occur;

determining, via the one or more hardware processors, a Conditional likelihood of an user taking a booklet $\underline{\mathcal{B}}$ which is given by:

$$p\left(x|x_+^{[\mathcal{B}]}\right) = \left(\prod_{j\in\mathcal{B}} p\left(x^{[\mathcal{M}_j]}|x_+^{[\mathcal{M}_j]}\right)\right) p\left(x_+^{[\mathcal{B}]}|x_+^{[\mathcal{B}]}\right) \text{ where } x_+^{[\mathcal{B}]} = \sum_{j\in\mathcal{B}} x_+^{[j]},$$

the sum of the module scores, and $$x_+^{[\mathcal{B}]} = \left(x_+^{[j]}\right),\ j \in \mathcal{B}$$

is the vector of scores on each of the modules in booklet $\underline{\mathcal{B}}$, wherein calibration is performed by maximizing each factor of Conditional likelihood separately, wherein Regular Conditional Maximum Likelihood (CML) is used to estimate the item parameters, $b^{[j]}$, of each module in separate calibrations and CML estimates of the shift parameters, $\eta_j$, that bring the module parameters on a common scale, are determined by keeping within-module relative difficulties of the items at estimated values; and aligning the estimated average difficulty level of each of the plurality of modules to a common scale based on the shift factor and comparing the estimated values across test forms, wherein the item category parameters across modules are aligned on a common scale using the change-of-origin property, wherein for all items in module k, a transformation $$\delta_{ij} \to \delta_{ij} - \eta_k a_{ij}$$

is used, wherein by aligning the estimated average difficulty level of each of the plurality of modules to the common scale, a plurality of users who took different combinations of the plurality of modules are assessed on the common scale.

6. The one or more non-transitory machine-readable information storage mediums of claim 5, wherein the average difficulty level of each of the plurality of modules indicates a relative difficulty of a plurality of questions across the plurality of modules.

* * * * *